March 7, 1967  G. H. DUNN, JR  3,307,748
APPARATUS FOR FEEDING FLOWABLE SOLID
MATERIALS TO A DELIVERY DEVICE
Filed Jan. 21, 1966
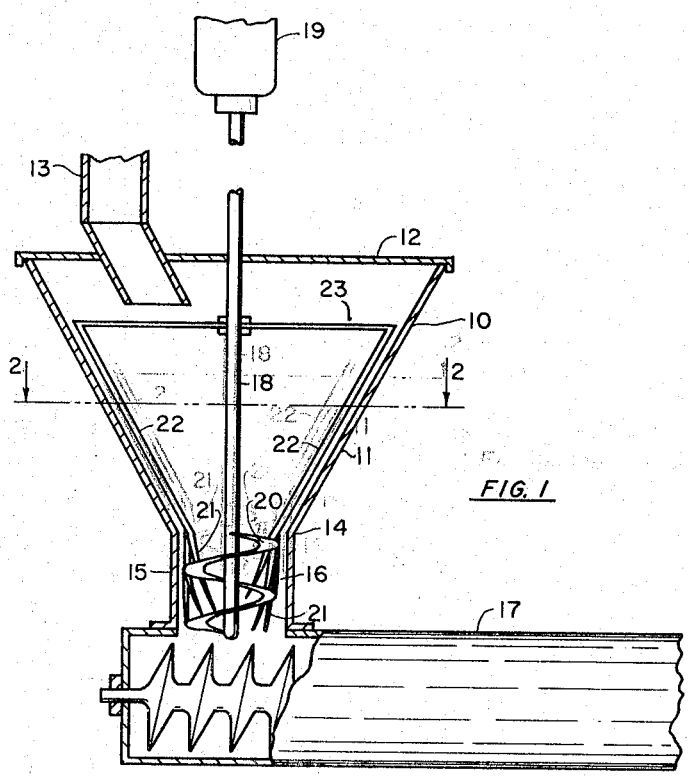
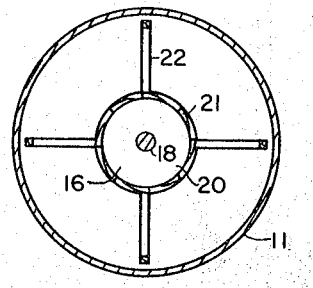
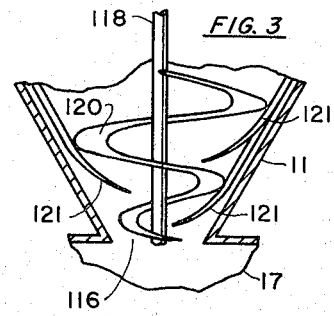
G. HARVEY DUNN, JR.
INVENTOR.
BY
Fred S. Valles

United States Patent Office

3,307,748
Patented Mar. 7, 1967

3,307,748
APPARATUS FOR FEEDING FLOWABLE SOLID MATERIALS TO A DELIVERY DEVICE
George Harvey Dunn, Jr., Odessa, Tex., assignor to Rexall Drug and Chemical Company, Los Angeles, Calif., a corporation of Delaware
Filed Jan. 21, 1966, Ser. No. 522,207
5 Claims. (Cl. 222—227)

This invention relates to a machine for feeding flowable solid materials to a delivery device, and more particularly, relates to an improved feed hopper for the uniform and controlled feeding of thermoplastic materials into an extruder.

Commercially available feeding devices for thermoplastic materials utilizing vertical flow or gravity-type feed hoppers having screw feeders, are widely known. Generally, feed hoppers of this type present problems in feeding the pastic materials into extruders, particularly when the materials fed consist of granulated solids or powders.

When the extruder, into which the material is fed by the feed hopper, is of the non-vented type, large quantities of vapors produced in the extruder are entrapped therein. This is caused by the use of extremely close clearances in the narrower throat section of the feed hoppers leading into the extruder, between the screw feeder and the encompassing inner wall of the feed hopper. The use of such close clearances prevents the vapors produced in the extruder from back-flowing into the feed hopper, because of build-up or agglomeration of materials in the narrow clearance space between the screw feeder and the feed hopper. Consequently, the vapors are forced out of the extruder with the plastic extrudate, thereby producing undesirable foamy polymer pellets. Other prior art feed hoppers attempted to solve this particular problem through the provision of excessive or unusually large clearances between the screw feeder and the inner wall of the feed hopper throat section. Although initially this eliminated the entrapment of vapors in the extruders by creating a passageway enabling the vapors to flow back into the feed hopper, these large clearances permitted the thermoplastic granules or powder to agglomerate, fuse or otherwise compact with the internal walls of the feed hopper throat section. This, in effect, gradually created a solid layer of material on the feed hopper walls which destroyed the clearance between the screw feeder and the feed hopper, thereby forming a barrier against the venting of the vapors from the extruders to the feed hopper.

It has been found that the provision of metallic ribbons, blades or bars attached to the screw feeder and projecting from the periphery thereof into proximity with the internal wall of the feed hopper throat section, would remove any material agglomerated on the feed hopper wall. Preferably, these bars, blades or ribbons should be attached to the screw feeder at a pitch opposite or counter to the pitch angle of the screw helix. This, then, will assure that any material removed by the bars or ribbons from the feed hopper wall, will be moved opposite to the direction of feed of the screw feeder and consequently, be recycled through the feed hopper. The action of the blades will provide a constant predetermined clearance between the screw feeder and the feed hopper wall at all times during the materials feeding process. A definite clearance dimension will always be maintained as a direct relationship to the width of the blades or ribbons.

Another important aspect of this invention lies in that the constant and complete removal of agglomerated thermoplastic materials by the bars, blades or ribbons will assure that subsequent batches of thermoplastic materials will not be contaminated with residues from prior fed materials. This is of particular significance where successive batches of different polymers are used which require high degrees of purity.

Accordingly, it is a primary object of this invention to provide an improved and novel feeding mechanism for thermoplastic materials.

It is a further object of this invention to provide an improved feed hopper which will maintain a constant flow of thermoplastic materials therethrough without undue agglomeration of the materials on the feed hopper walls.

Still another object of this invention is to provide a feed hopper of the screw feed type which includes means for maintaining a predetermined clearance between the screw feeder and the wall of the feed hopper.

A more particular object of this invention is to provide a feed hopper of the screw feed type for feeding thermoplastic materials to an unvented extruder, and wherein the screw feeder includes blade members adapted to remove materials agglomerating on the wall of the feed hopper, thereby facilitating the back flow of vapors from the extruder into the feed hopper by maintaining a predetermined clearance between the screw feeder and the feed hopper.

The manner in which these and other objects and advantages of this invention will be attained will become apparent from the following detailed description and drawings, in which:

FIGURE 1 is an elevational view partly in section of one embodiment of the machine according to this invention;

FIGURE 2 is a sectional view on line 2—2 of FIGURE 1; and

FIGURE 3 is a fragmentary elevational view in section of a second embodiment of the machine according to this invention.

As shown in FIGURE 1 of the drawing, one embodiment of the feeding apparatus 10 includes a generally conical feed hopper 11. A cover member 12 may be provided having a material inlet spout or chute 13 adapted to supply thermoplastic granules or powder to the feed hopper 11. The lower apex portion 14 of the feed hopper 11 is joined to a generally cylindrical member 15 which form a throat section or passageway 16 in communication with the interior of the feed hopper 11. The cylindrical member 15 is adapted to be fastened in communicative relationship with a material receiving device, shown in this instance to be a screw-type extruder 17.

A vertically positioned spindle 18 is positioned to extend centrally through the feed hopper 11 and cylindrical member 15. The spindle 18 is rotated by means of a drive unit 19, which may be an electrical motor, fluid drive, chain or pulley; none of which form an essential part of this invention.

The lower portion of spindle 18 within the confines of the cylindrical member 15 has a helical screw 20 fixedly attached thereto adapted to feed the thermoplastic material through the passageway 16 from the feed hopper 11 into extruder 17. A relatively large clearance is provided between the outside diameter of the helical screw 20 and the inner wall of cylindrical member 15. At the periphery of the helical screw 20 a plurality of ribbon-like blade members 21 are fastened thereto, extending radially outwardly into proximity with the inner wall of the cylindrical member 15. The blade members 21 extend along the helical screw 20 for substantially the entire vertical height of the passageway 16.

As thermoplastic granules or powder is fed into the feed hopper 11 by means of chute 13, it is supplied to the extruder 17 in predetermined controlled amounts by the rotative action of helical screw 20. Any material tending to compact with, adhere to or agglomerate on the inner wall of the cylindrical member 15 will be removed or scraped therefrom by the blade members 21 rotating in proximity thereto. This will assure that the clearance between the helical screw 20 and the inner wall of cylindrical member 15 is always maintained over the full extent of passageway or throat section 16.

The blade members 21 are preferably bent into spiral or helical configurations having pitch angles opposite or counter to the pitch angle of helical screw 20. This will cause any materials removed from the inner wall of cylindrical member 15 by blade members 21 to be propelled upwardly into feed hopper 11 and subsequently re-mixed with the material passing through the helical screw 20. As a result, the thermoplastic material being fed into the extruder will always possess the required consistency and freedom from impurities.

In order to prevent the agglomeration or compacting of material along the inner wall of the feed hopper 11, a plurality of rotatable bars 22 may be positioned in proximity thereto. These bars may be straight and extend upwardly for substantially the major portion of the feed hopper height. At their lower ends, bars 22 may be fastened to blade members 21, and at their upper ends to spindle 18 by means of cross-bar members 23.

In FIGURE 3 of the drawings, a second embodiment of the feeding apparatus 10, shows most of the elements to be identical to the aforedescribed embodiment, however, cylindrical member 15 has been eliminated, and feed hopper 11 is adapted to be attached directly to extruder 17.

A spindle 118 has a helical screw 120 attached thereto in the region of the lower apex or outlet portion 116 of the feed hopper 11. The helical screw 120 has screw flights of an external taper generally corresponding to the degree of taper of the inner wall of feed hopper 11, but at a fixed clearance therewith. The periphery of helical screw 120 has attached thereto a plurality of ribbon-like blade members 121, which extend into proximity with the inner wall of the feed hopper. The blade members 121 may be formed in a spiral or helical configuration, in a manner similar to those of blade members 21 of the first embodiment.

From the foregoing, it thus appears that in all respects the effect in operation of the second embodiment of the feeding apparatus is substantially analogous to that of the first described embodiment.

While particular embodiments of this invention are shown above, it will be understood that the invention is obviously subject to variations and modifications without departing from its broader aspects.

What is claimed is:
1. A machine for feeding flowable solids materials to a delivery device including a generally cone-shaped container terminating at its lower portion in an apex having a discharge port therein, a power driven rotatable spindle disposed vertically and centrally within said container and extending therethrough, spiral shaped material stirring means fixed to said spindle to rotate therewith inwardly of said container, and blade means fastened to said spiral shaped means and extending radially outwardly thereof in proximity to said container and positioned at pitch angles counter to the pitch angle of said spiral shaped means, whereby rotation of said spindle causes said blade means to remove materials agglomerating on said container wall and maintain a predetermined clearance between the latter and said spiral shaped means, and whereby materials removed from said container wall by said blade means are conveyed through said container in a direction opposite to the direction of feed of said spiral shaped means.

2. A machine for feeding flowable solid materials to a delivery device including a feed hopper, a power driven spindle disposed vertically and centrally within said feed hopper, helical screw means attached to said spindle adapted to feed material through said hopper to said delivery device, and means fastened to the radial extremities of said screw means, for removing materials agglomerated onto said feed hopper and for maintaining a predetermined clearance between said feed hopper and said feed screw means, wherein said means for removing agglomerated material comprises strips of material positioned at a pitch angle counter to the pitch angle of said screw means, whereby agglomerated material removed by said strips of material is recirculated in said feed hopper in directions other than the direction of feed of said screw means.

3. A machine as defined in claim 2 wherein said strips of material comprise a plurality of blades attached to said screw means and extending radially thereof, whereby agglomerated material removed by said blades is recirculated in said feed hopper in a direction opposite to the direction of feed of said screw means.

4. A machine for feeding flowable solids materials to a delivery device comprising a cone-shaped container terminating at its bottom portion in an apex having a discharge port therein, a cylindrical member attached to the bottom portion of said container concentrically therewith and adapted to provide a material outlet passageway in communication with said discharge port and said delivery device, a power driven rotatable spindle disposed vertically and centrally within said container and cylindrical member and extending therethrough, spiral shaped material stirring means fixed to said spindle to rotate therewith inwardly of said cylindrical member, and blade means fastened to said spiral shaped means and extending radially outwardly thereof in proximity to the wall of said cylindrical member, said blade means being positioned at pitch angles counter to the pitch angle of said spiral shaped means, whereby rotation of said spindle during feeding of material causes said blade means to remove materials agglomerated on the wall of the cylinder member and to convey the material so removed to the container in opposition to the direction of feed of said spiral shaped means.

5. A machine as defined in claim 4, including further blade means extending along the wall of said cone-shaped container through a substantial portion of the vertical height of the container, said blade means being fastened at their lower ends to said first blade means, and means fixing the other end of said further blade means to said spindle, whereby rotation of said spindle causes said blade means to remove materials agglomerated on the wall of said container.

References Cited by the Examiner

UNITED STATES PATENTS

| 1,851,044 | 3/1932 | Genovesi | 222—227 X |
| 1,859,290 | 5/1932 | Davis | 222—241 X |
| 2,589,583 | 3/1952 | Thompson | 222—241 X |
| 3,183,553 | 5/1965 | Slater | 222—241 X |

FOREIGN PATENTS

| 897,925 | 6/1944 | France. |

ROBERT B. REEVES, *Primary Examiner.*

N. L. STACK, *Assistant Examiner.*